C. LE G. FORTESCUE.
ELECTRICAL PROTECTIVE DEVICE.
APPLICATION FILED MAY 3, 1916.

1,224,370.

Patented May 1, 1917.

WITNESSES:

INVENTOR
Charles Le G. Fortescue.
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,224,370.   Specification of Letters Patent.   Patented May 1, 1917.

Application filed May 3, 1916. Serial No. 95,075.

*To all whom it may concern:*

Be it known that I, CHARLES LE G. FORTESCUE, subject of the King of Great Britain, and a resident of Pittsburgh, in the county of Allegheny and State of Pennsylvania, have invented a new and useful Improvement in Electrical Protective Devices, of which the following is a specification.

My invention relates to electrical-protective devices and particularly to means for protecting electrical translating devices in accordance with the temperatures thereof, the potentials impressed thereon and the currents traversing the same.

The object of my invention is to provide an electrical-protective device of the above-indicated character that shall be adapted to be actuated only when the temperature of the translating device to be protected reaches a predetermined value, and the time of operation of which shall vary in accordance with the potential impressed upon, and the current traversing, the translating device.

My copending application, Serial No. 51,867, filed September 21, 1915, discloses a resistor that is heated in accordance with the energy traversing a translating device. A constant-potential circuit, comprising a battery and an electro-responsive device, is connected across equal-potential points of the resistor. When the resistance of the resistor changes because of a change in temperature, the current that traverses the electro-responsive device varies substantially in accordance with variations in the temperature of the resistor. If the resistor is sufficiently lagged so that its heat emissivity, temperature gradient at currents corresponding to given loads and the heat capacity are the same as in the translating device, and, if the potential of the battery remains substantially constant, the electro-responsive device may be actuated in accordance with the temperature of the translating device.

In my present device, I utilize the novel features of the so-called exploring resistor set forth in the above-indicated application and further provide means whereby the electro-responsive device shall be adapted to be actuated in an interval of time that varies in accordance with the potential impressed upon, and the current traversing, the translating device to be protected. My present device has the additional advantage that no auxiliary source of electromotive force is required.

Figure 1:
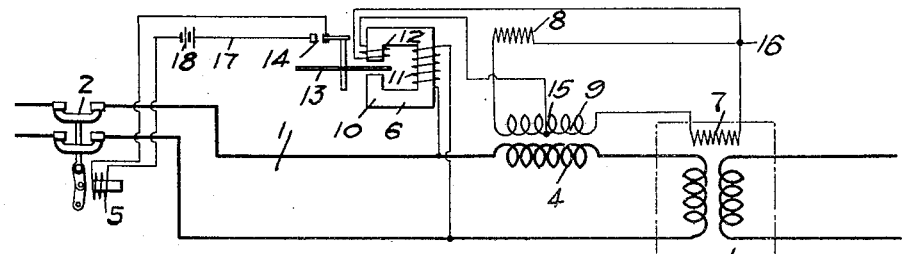
Figure 2:
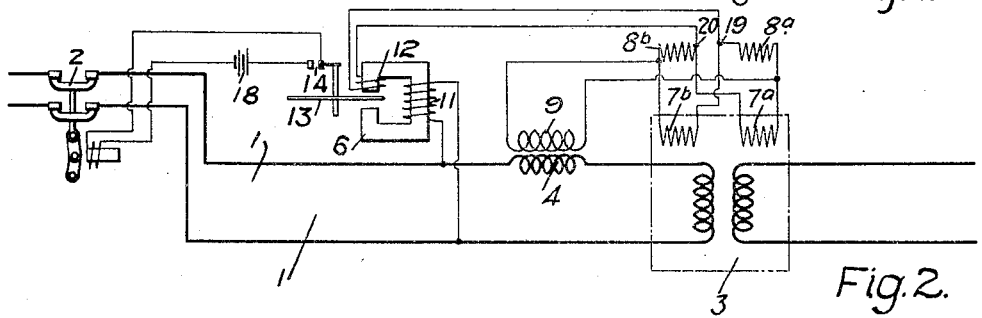
Figure 3:
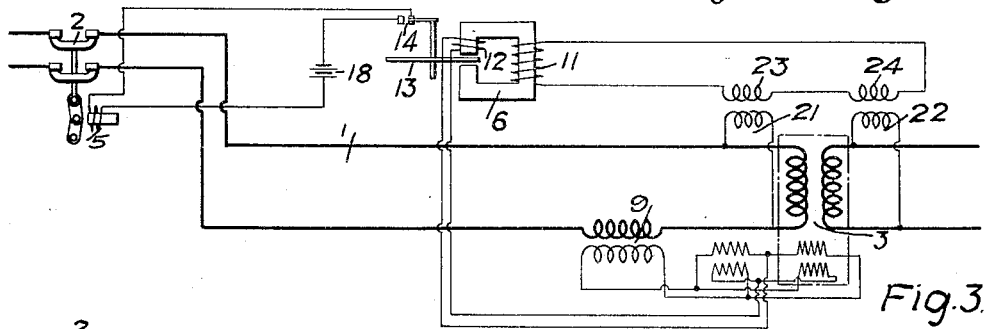
Figure 4:
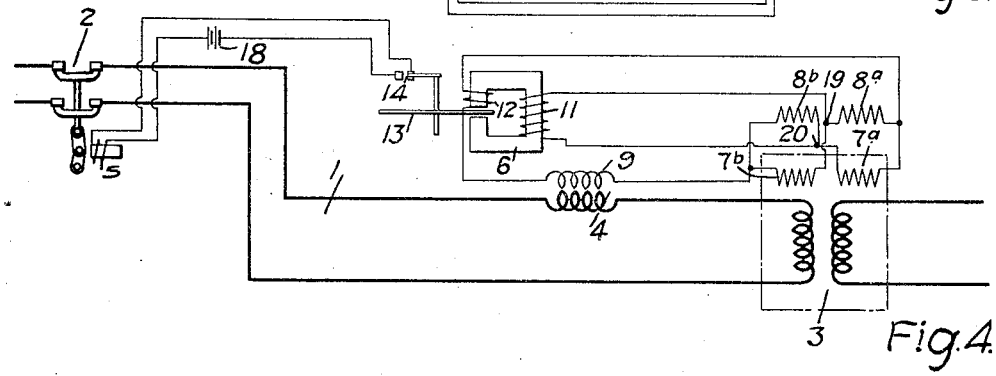

Figure 1 of the accompanying drawings is a diagrammatic view of an electrical circuit in which is connected a translating device that is adapted to be protected by a system embodying my invention. Fig. 2 is a diagrammatic view of an electric circuit in which is embodied a translating device that is adapted to be protected by a modified form of protective system embodying my invention. Figs. 3 and 4 are views similar to Figs. 1 and 2 but illustrating modified forms of protective systems embodying my invention.

In Fig. 1 of the drawings, an electric circuit 1 is provided with a circuit interrupter 2, an electrical translating device 3, such as a transformer or other similar device, and a series transformer 4. The circuit interrupter 2 is provided with a trip coil 5 that is adapted to be controlled by a relay 6 for the purpose of tripping the circuit interrupter in accordance with the temperature of the translating device 3.

An exploring resistor 7 is disposed in such relation to the translating device 3 that it is adapted to be heated in accordance with its temperature. For this purpose, it may be disposed in the same oil-containing tank or it may be disposed in any other receptacle if it is sufficiently lagged and has the same temperature gradient and heat emissivity as the device 3. A substantially constant-resistance resistor 8 is connected in series with the resistor 7, and the circuit thus constituted is connected to the terminals of the secondary winding 9 of the series transformer 4.

The relay 6 comprises a magnetizable core member 10, a potential winding 11, a current winding 12, an armature 13 and coöperating contact members 14. The potential winding 11 is connected across the conductors of the circuit 1, and the current winding 12 is connected from the mid-point 15 of the secondary winding 9 of the transformer 4 to the mid-point 16 between the resistors 7 and 8. The contact members 14 constitute the separable terminals of a trip-coil circuit 17 that comprises the trip coil 5 and a source 18 of electromotive force.

When the resistance of the resistors 7 and 8 is substantially the same, no current will traverse the current winding 12, and the armature 13 will not operate. Also, when the load on the transformer 3 is of such value that the resistance of the resistor 7 is less than the resistance of the resistor 8, current will traverse the winding 12 in the incorrect direction, and the contact members 14 will not engage. However, if the temperature of the transformer 3 increases because of its increased load, current will traverse the winding 12 in the correct direction and the armature 13 will turn to effect engagement of the contact members 14 to trip the circuit interrupter 2. It will be seen that, although the unbalancing depends upon the temperature of the transformer 3, the torque of the meter depends upon the potential impressed upon, and the current traversing, it. Since the time required for the armature to operate varies in inverse proportion to the potential impressed upon, and the current traversing, the transformer 3, the circuit interrupter 2 is adapted to be tripped in accordance with the temperature of the potential impressed upon, and the current traversing, the transformer.

In Fig. 2 of the drawings, two exploring resistors $7^a$ and $7^b$ are connected in series relation to two resistors $8^a$ and $8^b$ having substantially constant resistance. The circuit thus constituted is connected across the secondary winding 9 of the current transformer 4, and the mid-points 19 and 20 between the resistors $7^b$ and $8^a$ and $7^a$ and $8^b$, respectively, are connected to the current winding 12 of the relay 6. In other respects, the connections shown in Fig. 2 of the drawings are similar to those shown in Fig. 1. If the resistances of the resistors $7^a$ and $7^b$ change because of a change in temperature in the transformer 3, the balance that is normally afforded by the resistors $8^a$ and $8^b$ is upset and current will traverse the winding 12 of the relay 6 in a predetermined direction in accordance with the temperature of, and the current traversing, the windings of the transformer 3. If the current traverses the winding 12 in the correct direction, the time required for the contact members 14 to engage will vary inversely as the potential impressed upon, and the current traversing, the transformer 3.

If a short circuit occurs across the terminals of the winding 11, shown in Figs. 1 and 2, the voltage across the winding 11 may be so reduced that insufficient current will traverse it to permit the relay 6 to function properly. In Fig. 3 of the drawings I take care of this condition by providing two potential transformers 21 and 22 that are adapted to be connected across the primary and secondary windings, respectively, of the transformer 3. The secondary windings 23 and 24 of the transformers 21 and 22 are connected in series relation, and the circuit thus constituted is connected to the terminals of the winding 11 of the relay 6. Thus, if a short circuit occurs across either the primary or the secondary winding of the transformer 3, at least one of the potential transformers 21 and 22 will supply sufficient energy to the winding 11 to effect its proper operation. By such an arrangement, the time of operation of the armature 13 will be decreased upon the occurrence of a short circuit.

In Fig. 4 of the drawings, the series circuit, comprising the resistors $7^a$, $7^b$, $8^a$ and $8^b$, is connected through the current winding 12 of the relay 6 to the secondary winding 9 of the transformer 4, and the potential winding 11 of the relay 6 is connected across the mid-points 19 and 20 between the resistors $8^a$ and $7^b$ and $8^b$ and $7^a$, respectively. With such an arrangement, the potential winding 11 remains deënergized so long as the temperature of the transformer 3 is below a predetermined value, or, in other words, is so energized that the relay 6 will not operate in the correct direction until a predetermined value of temperature has been reached. When this predetermined temperature is reached and the current traversing the winding of the transformer 3 is of a predetermined value, sufficient current will traverse the windings 11 and 12 to effect engagement of the contact members 14, and the circuit interrupter 2 will be tripped, substantially as hereinbefore set forth.

While I have described a number of modifications of my invention, it is to be understood that my invention is not limited to the particular modifications set forth, as it is susceptible of many changes without departing from the spirit and scope of the appended claims.

I claim as my invention:

1. The combination with an electrical translating device, of a relay having a potential winding operatively connected across the terminals of the translating device and a current winding adapted to receive energy only when the temperature and the current traversing the translating device reach predetermined values.

2. The combination with an electrical translating device, of a relay having a potential winding operatively connected across the terminals of the translating device and a current winding adapted to receive energy in accordance with the temperature of, and the current traversing, the translating device.

3. The combination with an electric circuit and a translating device, of a relay having a potential winding operatively connected to the circuit and a current winding adapted to receive energy in the proper direction only when the temperature of, and the current traversing, the translating device reach predetermined values.

4. The combination with an electrical translating device, of means adapted to be heated in accordance with the temperature of the translating device, and a relay having a potential winding adapted to be operatively connected to the translating device and a current winding adapted to be so connected to the translating device and the means that is heated in accordance with the temperature of the translating device that it is supplied with current in accordance with the temperature of, and the current traversing, the translating device.

5. The combination with an electrical translating device, of an exploring resistor adapted to be heated in accordance with the temperature of the translating device, and a relay having a potential winding adapted to be connected to the terminals of the translating device and a current winding adapted to be so connected to the exploring resistor and the translating device that it is supplied with current in accordance with the temperature of, and the current traversing, the translating device.

6. The combination with an electrical translating device, of a resistor adapted to be heated in accordance with the temperature of the translating device, and a relay having two windings one of which is operatively connected to the translating device and the other of which is so connected to the resistor and the translating device that it is supplied with energy in accordance with the temperature of, and the current traversing, the translating device.

7. In an electrical circuit, the combination with a translating device, and a protective device therefor, of a resistor adapted to be heated in accordance with the temperature of the translating device, a relay for controlling the protective device, said relay having two windings one of which is adapted to be so electrically connected to the translating device and the said resistor that it is supplied with energy in accordance with the temperature of, the potential impressed upon, and the current traversing, the translating device.

8. The combination with an electrical translating device, of a resistor adapted to be heated in accordance with the temperature of the translating device, a relay having two windings, said windings being so connected to the translating device and the said resistor that the relay is adapted to operate in accordance with the temperature of, and the energy traversing, the translating device.

9. In a system of distribution, the combination with a translating device and a protective device therefor, of a resistor adapted to be maintained at a temperature proportional to the temperature of the translating device, a series transformer operatively connected to the translating device, a resistor maintained at the temperature of the air, and a relay adapted to control the operation of the protective device, said relay having a potential winding operatively connected to the translating device, and a current winding so connected to the resistor and the secondary winding of the current transformer that it is adapted to be energized in the proper direction only when the temperature of, the potential impressed upon, and the current traversing, the translating device reach predetermined values.

10. The combination with an electrical translating device, of a relay having a winding adapted to receive current in accordance with the combined effect of the temperature of, and the current traversing, the translating device.

11. The combination with an electrical translating device, of a relay having a winding adapted to receive current from the circuit in accordance with the combined effect of the temperature of, and the current traversing, the translating device.

In testimony whereof, I have hereunto subscribed my name this 26th day of April, 1916.

CHARLES LE G. FORTESCUE.

Copies of this patent may be obtained for five cents each, by addressing the "Commissioner of Patents, Washington, D. C."